United States Patent
Chand

(10) Patent No.: US 10,889,527 B2
(45) Date of Patent: Jan. 12, 2021

(54) AQUEOUS DISPERSIONS OF POTASSIUM CALCIUM POLYPHOSPHATE

(71) Applicant: LIQUID FERTILISER PTY LTD, Yatala (AU)

(72) Inventor: Ugesh Chand, Eagleby (AU)

(73) Assignee: Liquid Fertiliser Pty Ltd, Queensland (AU)

( * ) Notice: Subject to any disclaimer, the term of this patent is extended or adjusted under 35 U.S.C. 154(b) by 262 days.

(21) Appl. No.: 15/766,649

(22) PCT Filed: Oct. 6, 2016

(86) PCT No.: PCT/AU2016/050940
§ 371 (c)(1),
(2) Date: Apr. 6, 2018

(87) PCT Pub. No.: WO2017/059492
PCT Pub. Date: Apr. 13, 2017

(65) Prior Publication Data
US 2019/0062230 A1 Feb. 28, 2019

Related U.S. Application Data

(60) Provisional application No. 62/238,889, filed on Oct. 8, 2015.

(51) Int. Cl.
*C05B 13/06* (2006.01)
*A01C 21/00* (2006.01)

(52) U.S. Cl.
CPC .............. *C05B 13/06* (2013.01); *A01C 21/00* (2013.01)

(58) Field of Classification Search
CPC .................................. C05B 13/06; A01C 21/00
See application file for complete search history.

(56) References Cited

U.S. PATENT DOCUMENTS

| | | | |
|---|---|---|---|
| 2,601,066 A | 6/1952 | Sourdet et al. |
| 3,607,213 A | 9/1971 | Schroeder et al. |
| 5,374,294 A | 12/1994 | Moore |
| 2004/0086545 A1 | 5/2004 | Berger et al. |

FOREIGN PATENT DOCUMENTS

| | | |
|---|---|---|
| CN | 1472176 A | 2/2004 |
| CN | 1590348 A | 3/2005 |
| CN | 1594239 A | 3/2005 |
| GB | 473 520 A | 10/1937 |
| JP | S35-006723 | 12/1930 |
| JP | S50-099861 A | 8/1975 |
| JP | H03-082794 A | 4/1991 |
| JP | H07-206557 A | 8/1995 |
| WO | 19947026660 A1 | 11/1994 |

OTHER PUBLICATIONS

Brown, E. H., et al. "Fertilizer materials, preparation and characterization of some calcium pyrophosphates." Journal of Agricultural and Food Chemistry 11.3 (1963): 214-222.*
International Search Report for corresponding PCT/AU2016/050940 dated Apr. 5, 2017.
Supplemental European Search Report for corresponding EP Application No. 16 85 2902 dated May 13, 2019.
English language translation for Japanese Office Action dated Jul. 14, 2020 for related application No. JP 2018-517209 (4 pp).

* cited by examiner

*Primary Examiner* — Jennifer A Smith
(74) *Attorney, Agent, or Firm* — Renner, Kenner; Arthur M. Reginelli

(57) ABSTRACT

An aqueous dispersion comprising water and potassium calcium polyphosphate dispersed within the water.

14 Claims, No Drawings

AQUEOUS DISPERSIONS OF POTASSIUM CALCIUM POLYPHOSPHATE

This application is a National-Stage application of PCT/AU2016/050940 filed on Oct. 6, 2016, which claims the benefit of U.S. Provisional Application Ser. No. 62/238,889, filed on Oct. 8, 2015, which is incorporated herein by reference.

FIELD OF THE INVENTION

Embodiments of the present invention are directed toward stable aqueous dispersions of potassium calcium polyphosphate. Other embodiments are directed toward methods for preparing stable aqueous dispersions of potassium calcium polyphosphate, and yet other embodiments are directed toward the use of stable dispersions of potassium calcium polyphosphate as liquid fertilizer.

BACKGROUND OF THE INVENTION

Divalent metal phosphates have been proposed as fertilizers. These compounds advantageously provide multiple nutrients and exhibit slow, controlled release properties. To date, divalent metal phosphates have been produced as solid materials, and therefore techniques for their use as plant nutrients have been limited to the application of solids in the form of, for example, pellets. For example, U.S. Pat. No. 5,374,294 teaches a controlled, slow-release potassium divalent metal phosphate composition. These compositions are prepared by co-reacting concentrated potassium hydroxide, divalent metal oxide powder, and concentrated phosphoric acid. This reaction produces a damp dry, particulate, water-insoluble potassium divalent metal phosphate.

SUMMARY OF THE INVENTION

One or more embodiments of the present invention provide an aqueous dispersion comprising water and potassium calcium polyphosphate dispersed within the water.

Other embodiments provide a method for preparing a flowable liquid fertilizer, the method comprising the steps of providing a solution of potassium polyphosphate, and introducing a water-soluble calcium salt to the aqueous solution of tetrapotassium pyrophosphate to form the flowable liquid fertilizer in the form of an aqueous dispersion.

Still other embodiments of the present invention provide A method of applying dipotassium calcium pyrophosphate as a fertilizer to plant, the method comprising of providing an aqueous dispersion of potassium calcium polyphosphate; and applying the aqueous dispersion of potassium calcium polyphosphate to the plant.

DETAILED DESCRIPTION OF ILLUSTRATIVE EMBODIMENTS

Embodiments of the invention are based, at least in part, on the discovery of a stable aqueous dispersion of potassium calcium polyphosphates (e.g. dipotassium calcium pyrophosphate). The aqueous dispersion is uniquely prepared in a step reaction by first providing an aqueous solution of a potassium polyphosphate, and then a water-soluble calcium salt is introduced to the solution to thereby form the aqueous dispersion. Thus, while potassium calcium polyphosphates are appreciably insoluble in water, it has unexpectedly been discovered that a stable, flowable aqueous dispersions can be achieved by practice of embodiments of this invention.

The stable aqueous dispersions advantageously provide novel methods for providing nutrients to plants by way of a liquid fertilizer.

Method to Produce Aqueous Dispersion

As indicated above, aqueous dispersions of potassium calcium polyphosphate are prepared by a method including (i) providing an aqueous solution of a potassium polyphosphate, and (ii) introducing a water-soluble calcium salt to the aqueous solution to thereby form the aqueous dispersion. In these or other embodiments, agrochemicals (e.g. plant nutrition compounds, plant growth regulators, and/or plant beneficial microbes) can be added to the aqueous dispersion.

Preparation of Tetrapotassium Pyrophosphate Solution

In one or more embodiments, the potassium polyphosphate is a tetrapotassium pyrophosphate. In one or more embodiments, an aqueous solution of tetrapotassium pyrophosphate is prepared by simply dissolving tetrapotassium pyrophosphate in water. Advantageously, the tetrapotassium pyrophosphate readily dissolves in water. In other embodiments, the desired potassium polyphosphate, such as tetrapotassium pyrophosphate, can be formed in situ; in other words, it is formed within water to thereby form the aqueous solution. For example, dipotassium pyrophosphate acid can be to water with potassium hydroxide to provide the desired aqueous solution. Alternatively, neat pyrophosphoric acid can be combined with an appropriate amount of potassium hydroxide to provide the desired aqueous solution.

In one or more embodiments, the concentration of the tetrapotassium pyrophosphate within the aqueous solution may be described based upon the weight parts of tetrapotassium pyrophosphate relative to the water. In one or more embodiments, the tetrapotassium pyrophosphate solution includes at least 10, in other embodiments at least 50, in other embodiments at least 100, in other embodiments at least 150, and in other embodiments at least 200 parts by weight tetrapotassium pyrophosphate per 100 parts by weight water. In these or other embodiments, the tetrapotassium pyrophosphate solution includes at most 1000, in other embodiments at most 500, in other embodiments at most 350, in other embodiments at most 300, and in other embodiments at most 250 parts by weight tetrapotassium pyrophosphate per 100 parts by weight water. In one or more embodiments, the tetrapotassium pyrophosphate solution includes from about 10 to about 1000, in other embodiments from about 150 to about 300, and in other embodiments from about 200 to about 250 parts by weight tetrapotassium pyrophosphate per 100 parts by weight water.

In one or more embodiments, the preparation of the tetrapotassium pyrophosphate solution may take place at standard conditions. For example, in particular embodiments, the solution can be prepared at ambient temperatures. In one or more embodiments, the solution of tetrapotassium pyrophosphate may be prepared at temperatures of less than 150, in other embodiments less than 125, in other embodiments less than 100, in other embodiments less than 80, in other embodiments less than 60 and in other embodiments less than 40° C. In these or other embodiments, the solution of tetrapotassium pyrophosphate may be prepared at temperatures greater than 20, in other embodiments greater 30, in other embodiments greater than 40, in other embodiments greater than 50, and in other embodiments greater than 60° C. In particular embodiments, the temperature of the solution of tetrapotassium pyrophosphate during preparation may be maintained within a narrow temperature variation; for example, the temperature may be maintained within +/−15, in other embodiments +/−10, in other embodiments +/−5, and in other embodiments +/−3° C.

In one or more embodiments, the preparation of the tetrapotassium pyrophosphate solution may take place at atmospheric pressure. In other embodiments, the solution can be prepared under vacuum at, for example, less than 0.5 atmospheres, or in other embodiments at, for example, less than 0.25 atmospheres. In yet other embodiments, the solution can be prepared at elevated pressures. In one or more embodiments, the solution can be prepared by using conventional emulsification techniques and equipment.

Introduction of Water-Soluble Calcium Salt

As indicated above, a water-soluble calcium salt is introduced to the aqueous solution of potassium polyphosphate (e.g. tetrapotassium pyrophosphate). Again, without wishing to be bound by any particular theory, it is believed that the potassium polyphosphate and the water-soluble calcium salt react or interact to produce dipotassium calcium pyrophosphate, which may be represented by the molecular formula $CaK_2P_2O_7$. Embodiments of the invention, however, are not limited by the exact structure nor purity of the dipotassium calcium pyrophosphate produced. To the skilled person, it is apparent that optimizing the declared ratios and reactions conditions of this invention may produce slightly different composition of potassium calcium polyphosphate. For example, one such form could be a mixture of aqueous dispersion of colloids of monomeric species of $CaK_2P_2O_7$ and polymeric species of $Ca_{10}K_4(P_2O_7)_6$ in varying concentrations of each molecule. The term "dipotassium calcium pyrophosphate" will nonetheless be employed to refer to this reaction product.

In one or more embodiments, the water-soluble calcium salt may include calcium acetate, calcium thiosulphate, calcium formate, calcium nitrate, calcium chloride, or mixtures of two or more thereof. In particular embodiments, calcium acetate anhydrous is employed. In one or more embodiments, the calcium acetate anhydrous may be characterized by a purity of at least 98% or in other embodiments at least 99%. In other embodiments, calcium acetate monohydrate is employed. In other particular embodiments, calcium chloride and calcium acetate are used in combination, which combination advantageously addresses both solubility and cost concerns.

In one or more embodiments, the amount of water-soluble calcium salt (e.g. calcium acetate) introduced to the aqueous mixture of tetrapotassium pyrophosphate may be described based upon the molar ratio of the moles of calcium within the water-soluble calcium salt to the moles of phosphorus within the tetrapotassium pyrophosphate (i.e., moles of Ca to moles of P). In one or more embodiments, the molar ratio of moles of calcium within the water-soluble calcium salt to the moles of phosphorus within the tetrapotassium pyrophosphate may be at least 1:0.5, in other embodiments at least 1:1, in other embodiments at least 1:2, in other embodiments at least 1:3, and in other embodiments at least 1:3.5. In one or more embodiments, the molar ratio of moles of calcium within the water-soluble calcium salt to the moles of phosphorus within the tetrapotassium pyrophosphate may be at most 1:10, in other embodiments at most 1:7, in other embodiments at most 1:6, in other embodiments at most 1:5, and in other embodiments at most 1:4.5. In one or more embodiments, the molar ratio of moles of calcium within the water-soluble calcium salt to the moles of phosphorus within the tetrapotassium pyrophosphate may be from about 1:1 to about 1:7, in other embodiments from about 1:2 to about 1:6, in other embodiments from about 1:3 to about 1:5, and in other embodiments from about 1:3.5 to about 1:4.5.

In one or more embodiments, the preparation of the dipotassium calcium pyrophosphate (i.e. the step of adding water-soluble calcium salt and subsequent reaction) may take place at standard conditions. This may include the temperature of the aqueous solution of potassium polyphosphate at the time the water-soluble calcium salt is introduced. This may also include the temperature at which the mixture and/or reaction product is agitated after the addition of the water-soluble calcium salt. For example, in particular embodiments, the dipotassium calcium pyrophosphate can be prepared at ambient temperatures. In one or more embodiments, the dipotassium calcium pyrophosphate may be prepared at temperatures of less than 150° C., in other embodiments less than 125° C., in other embodiments less than 100° C., in other embodiments less than 80° C., in other embodiments less than 60° C. and in other embodiments less than 40° C. In these or other embodiments, the dipotassium calcium pyrophosphate may be prepared at temperatures greater than 20° C., in other embodiments greater 30° C., in other embodiments greater than 40° C., in other embodiments greater than 50° C., and in other embodiments greater than 60° C. In particular embodiments, the temperature of the reaction mixture may be maintained within a narrow temperature variation; for example, the temperature may be maintained within +/−15, in other embodiments +/−10, in other embodiments +/−5, and in other embodiments +/−3° C.

In one or more embodiments, the preparation of the dipotassium calcium pyrophosphate may take place at atmospheric pressure. In other embodiments, the dipotassium calcium pyrophosphate can be prepared under vacuum at, for example, less than 0.5 atmospheres, or in other embodiments at, for example, less than 0.25 atmospheres. In yet other embodiments, the mixture can be prepared at elevated pressures.

In one or more embodiments, the dipotassium calcium pyrophosphate can be prepared by using conventional mixing techniques and equipment. In one or more embodiments, the aqueous solution of potassium polyphosphate may be agitated during introduction of the water-soluble calcium salt. This may include high-shear mixing or high-intensity mixing, which may be provided by, for example, rotor-stator mixers, homogenizers, colloid mills, or ultra-high shear mixers. Likewise, the resultant mixture and/or reaction product may be mixed using conventional mixing techniques. In one or more embodiments, the resultant mixture and/or reaction product may be agitated to achieve a desired particle size. This mixing, which follows introduction of the water-soluble calcium salt, may include high-shear mixing, which may be provided by rotor-stator mixers, homogenizers, colloid mills, or ultra-high shear mixers. In one or more embodiments, the resultant mixture and/or reaction product is subjected to emulsification. In one or more embodiments, emulsification is employed to prepare the solution of tetrapotassium pyrophosphate. In these or other embodiments, emulsification is employed during the introduction of the water-soluble calcium salt. In one or more embodiments, emulsification is employed after introduction of the water-soluble calcium salt. While it has been discovered that the nature of the reactants and the relative amounts of the reactants ultimately dictate the particle size that can be achieved, the skilled person will appreciate that mixing intensity, particularly the mixing intensity imparted on the resultant mixture and/or reaction product, is inversely proportional to the time that may be required for the particular level of agitation to provide the desired particle size at any given mixing temperature.

In one or more embodiments, the pH of the aqueous dispersion of calcium pyrophosphate can be adjusted to achieve a desired pH. This can be accomplished by the addition of, for example, an organic acid. Useful organic acids include glacial acetic acid, acetic acid solution (e.g., 90% solution), formic acid, maleic acid, succinic acid, propionic acid, citric acid, or combinations of two or more of these acids. Adjustment of the pH can take place before or after the addition of the other optional agrochemicals.

After formation of the dipotassium calcium pyrophosphate, and optionally after adjustment of the pH of the dispersion, other ingredients may be added to the aqueous dispersion. These other constituents may include constituents and/or adjuvants that are conventional in the art. For example, one or more biocides may be included such as, but not limited to, hexa-hydro 1,3,5 tris(2 hyroxyethyl)-symtriazine, which is available under the trade names Glokill 77 or Emulcid. In these or other embodiments, one or more antifoaming agents may be introduced. Useful antifoaming agents include, but are not limited to, polydimethylsiloxane, which is available under the trade names Gensil 2030, Silfax, and Ziameter. The skilled person will be able to readily determine an appropriate amount other constituents and/or adjuvants based upon desired needs.

Addition of Optional Agrochemicals

As indicated above, one or more agrochemicals may be added to the aqueous dispersion. For example, plant nutrition compounds, plant growth regulators, plant beneficial microbes, soil conditioners, and/or plant biostimulants may be added to the aqueous dispersion. The amount of these chemicals added to the aqueous dispersion can be varied based upon a number of factors such as, but not limited to, crop type, stage of growth or soil type and known nutrient status of the soil.

In one or more embodiments, useful plant nutrition compounds include sources of nitrogen. Exemplary nitrogen substitutes, including controlled release nitrogen sources, include urea, potassium nitrate, ammonium nitrate, ammonium sulphate, urea ammonium nitrate, calcium nitrate, magnesium nitrate and organic nitrogen as derived from plant, animal or fish based sources such as protein hydrolysates, fish emulsion or corn steep liquor.

In other embodiments, the plant nutrition compounds may include sources of macro, secondary or plant micronutrients.

Exemplary potassium-containing plant micronutrients include, but are not limited to, potassium thiosulfate, potassium chloride, potassium nitrate, potassium sulfate, potassium magnesium sulfate.

Exemplary phosphorus-containing plant micronutrients include, but are not limited to monopotassium phosphate, dipotassium phosphate, monopotassium phosphate, dipotassium phosphate, calcium phosphate, tetrapotassium pyrophosphate, ammonium polyphosphate, sodium tripolyphosphate, phosphoric acid and phosphorous acid.

Exemplary sulfur-containing plant micronutrients include, but are not limited to, calcium sulphate, magnesium sulphate, calcium thiosulphate, magnesium thiosulphate, potassium thiosulphate, ammonium thiosulphate, potassium sulphate, and monopotassium sulphate.

Still other exemplary plant micronutrients include, but are not limited to, iron sulphate, manganese sulphate, copper sulphate, zinc sulphate, boric acid, sodium molybdate, ammonium molybdate, ferric chloride, zinc chloride, zinc nitrate, as well as chelates thereof (i.e., chelated forms thereof).

Exemplary plant growth modifiers or regulators include, but are not limited to, auxins and cytokinins in synthetic form or in natural derived form such as seaweed or seaweed extracts.

Exemplary plant beneficial microbes include but not limited to *Bacillus* spp, *Paenobacillus* spp, *Brevibacillus* spp, *Metarhizium* spp, *Trichoderma* spp, *Glomus* spp, Vesicular Arbuscular Mycorrhizae, *Rhizobium* spp, *Bradyrhizobium, Paecilomyces* spp, and *Beauveria* spp.

Exemplary soil conditioners and/or plant biostimulant include, but are not limited to, humic and fulvic acids, which may be in the form of liquid potassium humate (Supa Humus 26, Agrichem), liquid potassium fulvate (Supa Fulvic 6, Agrichem), powder/flake or crystalline potassium humate and powder/flake or crystalline potassium fulvate. The humic and fulvic may be derived from peat, leonardite or brown coat. In addition to humic and fulvic acids, ammonium lignosulfonate, potassium lignosulfonate and sodium lignosulfonate such as, but not limited to, Marasperse AG and Borregro HA-1 powder (Borregaard Lignotech) may also be useful.

Finishing Techniques and Procedures

In one or more embodiments, the aqueous dispersion of dipotassium calcium pyrophosphate may be subjected to one or more finishing procedures prior to storage, transportation, and/or use. For example, in one or more embodiments, the aqueous dispersions may be subjected to filtering in order to remove processing debris or raw material impurities released from the raw materials during the course of the synthesis. This may include filtering the aqueous dispersion through a 100 micron down to 1 micron filter bag of either mesh or felt fabric, although the skilled person can choose finer filtering materials to achieve smaller particle sizes.

Characteristics of Aqueous Dispersion

As indicated above, it is believed that the methods described herein yield an aqueous dispersion of dipotassium calcium pyrophosphate. This dispersion may be characterized by one or more advantageous characteristics.

In one or more embodiments, the aqueous dispersion of dipotassium calcium pyrophosphate is characterized by a pH of at least 6.0, in other embodiments at least 7.0, in other embodiments at least 8.0, in other embodiments at least 8.5, and in other embodiments at least 8.7. In these or other embodiments, the dispersion of dipotassium calcium pyrophosphate is characterized by a pH of at most 14, in other embodiments at most 12, in other embodiments at most 10, in other embodiments at most 9.5, and in other embodiments at most 9.0. In one or more embodiments, the aqueous dispersion of dipotassium calcium pyrophosphate is characterized by a pH of from about 6.0 to about 14, in other embodiments from about 7.0 to about 12, in other embodiments from about 8.0 to about 10, and in other embodiments from about 8.5 to about 9.5. The choice of target pH may depend on the end-application of the formulation and/or the choice of the optional agrochemicals that may be added to the composition.

In one or more embodiments, the aqueous dispersion of dipotassium calcium pyrophosphate is characterized by an advantageous particle size. In one or more embodiments, the particles within the dispersion may be quantitatively characterized by a distribution where at least 90%, in other embodiments at least 95%, and in other embodiments at least 99% of the particles dispersed within the aqueous dispersion have a particle size of less than 1 micron. In one or more embodiments, at least 90%, in other embodiments at least 95%, and in other embodiments at least 99% of the particles dispersed have a mean particle size of from 0.1 to 0.5, or 0.2 to 0.4 microns. In one or more embodiments, the aqueous dispersions of this invention are characterized in that the dispersions are colloidal dispersion, which the skilled person appreciates refers to those dispersions where the average particle size of the dispersed particles is less than 1.0 micron and generally in the range of about 0.1 to about 1.0 micron. In these or other embodiments, the particles within the dispersion may be quantitatively characterized by a $D_{50}$ of less than or equal to 20 μm, in other embodiments less than 10 μm, in other embodiments less than 5 μm, in other embodiments less than 3 μm, and in other embodiments less than 1 μm (i.e. 50% of the particles have a diameter that is at or below the specified length). In these or other embodiments, the particles within the dispersion may be quantitatively characterized by a $D_{90}$ of less than or equal to 50 μm, in other embodiments less than 25 μm, in other embodiments less than 12 μm, in other embodiments less than 5 μm, in other embodiments less than 3 μm, and in other embodiments less than 1 μm (i.e. 90% of the particles have a diameter that is at or below the specified length).

In one or more embodiments, the particles of dipotassium calcium pyrophosphate may be characterized by a platelet or sheet-like shape. These platelet particles may be characterized by having at least one dimension that is less than 1, in other embodiments less than 0.5, in other embodiments less than 0.3, in other embodiments less than 1.5, and in other embodiments less than 1.0 micron. Other particle shapes may also be employed. In one or more embodiments, these other shapes, such as needles or cubes, may have a contact surface area (i.e. the surface of the particle that contacts the substrate, such as a leave of a plant) relative to the total surface of the particle of greater than 1:6, in other embodiments greater than 1:4, in other embodiments greater than 1:3, and in other embodiments greater than 1:2.5.

In one or more embodiments, the aqueous dispersion of dipotassium calcium pyrophosphate is characterized by a Brookfield viscosity (as measured using Brookfield RVT, spindle #3, at 25° C. and 50 rpm) of at least 900, in other embodiments at least 1,000 in other embodiments at least 1,200, and in other embodiments at least 1,500 cps. In these or other embodiments, the aqueous dispersion of dipotassium calcium pyrophosphate is characterized by a Brookfield viscosity of less than 5,000, in other embodiments less than 3,000, in other embodiments less than 2,700, and in other embodiments less than 2,500 cps. In one or more embodiments, the aqueous dispersion of dipotassium calcium pyrophosphate is characterized by a Brookfield viscosity of from about 900 to about 5,000, in other embodiments from about 1,000 to about 3000 in other embodiments from about 1,200 to about 2,700, and in other embodiments from about 1,500 to about 2,500 cps.

In one or more embodiments, the dispersion prepared according to this invention includes a mixture of suspended solids and also dissolved solids. The solids content can be varied based upon the addition of plant nutrition compounds or plant growth regulators. In one or more embodiments, the total solids content varies between 40% w/w to 60% w/w, or in other embodiments between 45% w/w to 55% w/w. In one or more embodiments, the suspended sub-micron solids content can vary from 15% w/w to 25% w/w, or in other embodiments 18% w/w to 22% w/w approximately.

In one or more embodiments, the aqueous dispersion of dipotassium calcium pyrophosphate is characterized by an advantageous shelf life, which may be defined according to CIPAC method: MT 46 Accelerated Storage Tests by Heating or APVMA, December 2005, Guidelines for Generation of Storage Stability Data of Agricultural Chemical Products. In one or more embodiments, the shelf life may be at least 12 months, in other embodiments at least 18 months, and in other embodiments at least 24 months.

In one or more embodiments, the aqueous dispersions of dipotassium calcium pyrophosphate prepared according to the present invention may be characterized by an advantageous zeta potential, which may be determined by micro-electrophoresis and/or electrophoretic light scattering. In one or more embodiments, the zeta potential is greater than +30, in other embodiments greater than +35, in other embodiments greater then +40, and in other embodiments greater than +45 milliVolts at a pH of 7+/−1. In other embodiments, the zeta potential is less than −30, in other embodiments less than −35, in other embodiments greater then −40, and in other embodiments less than −45 milliVolts at a pH of from about 6.0 to about 14, in other embodiments from about 7.0 to about 12, in other embodiments from about 8.0 to about 10, and in other embodiments from about 8.5 to about 9.5.

In one or more embodiments, the aqueous dispersions of dipotassium calcium pyrophosphate prepared according to the present invention may be characterized by a refractive index of from about 1.3 to about 1.9, in other embodiments from about 1.4 to about 1.8, and in other embodiments from about 1.4 to about 1.7

Use as Liquid Fertilizer

As indicated above, the aqueous dispersions of dipotassium calcium pyrophosphate produced according to the present invention can advantageously be used as liquid fertilizer. These liquid fertilizers can advantageously be applied as flowable liquids directly to plant life by way of foliar application. In other embodiments, these liquid fertilizers can be applied to soils such as, but not limited to, sands, silts, and clays. In yet other embodiments, these liquid fertilizers may be added directly to nutrient solutions employed in soilless growing systems such as, but not limited to, hydroponics, nutrient film techniques, and those fertigation/irrigation systems that employ media such as coca peat, coir, and rockwool. In still other embodiments, these dispersions can be directly applied to seeds (i.e., seed coating, seed dressing, and seed treatment). In yet other embodiments, the dispersions of this invention can be used to coat and/or impregnate solid fertilizer granules and prills such as, but not limited to, diammonium phosphate, mono-ammommonium phosphate, monopotassium phosphate, and urea. In other embodiments, the dispersions of this invention can be dispersed into other fertilizers during their production; for example, it can be dispersed into urea melt (such as urea lava at 150° C.) and then cooled. Advantageously, a wide range of loadings are possible when combining the dispersion of this invention with the manufacture of the commodity fertilizer and/or post adding the dispersion as a surface coating to commodity fertilizers.

In one or more embodiments, while the aqueous dispersions of dipotassium calcium pyrophosphate, as described above, may be fairly concentrated, which can facilitate transportation and storage, these aqueous dispersions can then be diluted prior to use in the field. For example, those skilled in the art will be able to make and use diluted compositions based upon desired usage rates for the dipotassium calcium pyrophosphate and/or complementary fertilizers such as a source of nitrogen.

The dispersions prepared in one or more embodiments of this invention are advantageously compatible with other agrochemicals within aqueous solutions. For example, the aqueous dispersions of dipotassium calcium pyrophosphate can be combined with concentrated (including saturated) solutions of, for example, diammonium phosphate, mono-ammonium phosphate, and urea while maintaining the dispersion of the dipotassium calcium pyrophosphate and the solubility of the complementary chemical (e.g. diammonium phosphate). Moreover, these compatible liquid fertilizer systems can be prepared without the use of chelates. Additionally, these liquid fertilizer systems, which include compatible blends of the insoluble dipotassium calcium pyrophosphate with concentrated solutions of agrochemicals, are advantageously stable for extended periods such as at least 1 day, in other embodiments at least 3 days, in other embodiments at least 1 week.

The aqueous dispersions of dipotassium calcium pyrophosphate, or diluted compositions thereof, can be applied to a plant by employing a variety of techniques. In one or more embodiments, spraying techniques are employed. In other embodiments, the liquid fertilizer produced according to the present invention can be applied to the plant through the soil. Known techniques include saturating or drenching the surrounding soil with the aqueous dispersion. Specific application methods may employ a spray boom, a hand sprayer, low volume applicators, high and low volume field-mounted equipment, aerial sprayers, controlled droplet applicators, CDA equipment, and/or combinations thereof.

The liquid fertilizers of this invention may advantageously be applied to a variety of agricultural crops. And, it has been discovered that the dipotassium calcium pyrophosphates prepared according to this invention have several agricultural benefits. For example, the dipotassium calcium pyrophosphates prepared according to embodiments of this invention are believed to enhance the mobility and translocation of nutrients (e.g., potassium, calcium, and phosphorus) within the soil. Also, the dipotassium calcium pyrophosphates are believed to contribute to the prolonged availability of nutrients to the plant, and protect the nutrients from chemical and soil tie up.

In order to demonstrate the practice of the present invention, the following examples have been prepared and tested. The examples should not, however, be viewed as limiting the scope of the invention. The claims will serve to define the invention.

EXPERIMENTAL SECTION

Example 1

To a two liter polypropylene graduated beaker was added 320 grams of water and 575 grams of tetrapotassium pyrophosphate (96.0% minimum purity) to form a solution of tetrapotassium pyrophosphate (TKPP solution). The beaker was stirred by using an IKA Rw20n bench-top overhead mixer fitted with a 40 cm long, four-blade 5 cm stainless steel paddle at 1700 rpm. It was noted that the pH was 12.1.

In a separate one liter polypropylene graduated beaker was added 340 grams of water and 125 grams of calcium acetate anhydrous (98.0% minimum purity) to form a solution of calcium acetate. The second beaker was stirred until the solids were completely dissolved, forming a clear colorless solution. It was noted that the pH was 9.2.

The dissolved calcium acetate was charged to the beaker with the TKPP solution over a period of 2 minutes to produce insoluble particles of potassium calcium pyrophosphate. The temperature of the mixture was 48° C. at the end of the calcium acetate addition. Mixing continued at 1700 rpm for 60 minutes, at which time 30 grams of glacial acetic acid was charged slowly over a period of one minute. Mixing continued for another 6 hours at 1700 rpm at which time 50 grams of hydrated gum base was added to the mix, followed by 0.5 gram of Antifoam. Mixing continued at 1700 rpm for one hour. Water was then added to form a one liter mixture.

The ingredients employed in this example are summarized in the Table. Physical and chemical testing was performed, and the results are also provided in the Table. Specific gravity was conducted using a DMA35 Density Meter at 25° C., pH was determined at 25° C., viscosity was determined using a Brookfield RVT viscometer with a #3 spindle at 25° C., particle size was determined using a Malvern Mastersizer 2000, elemental content was determined using Inductively Coupled Plasma Optical Emission Spectrometer, and insoluble content was determined using a Gravimetric method (involving dilution of sample, settling of solids and then drying of the solids).

TABLE

| | Example: | | | | | | | | |
|---|---|---|---|---|---|---|---|---|---|
| | 1 | 2 | 3 | 4 | 5 | 6 | 7 | 8 | 9 |
| INGREDIENTS (GRAMS) | | | | | | | | | |
| Water | 660 | 675 | 383 | 711 | 500 | 670 | 742 | 766 | 645 |
| Tetrapotassium Pyrophosphate (96%, Redox) | 575 | 500 | 575 | 350 | 575 | 575 | | 425 | 575 |
| Calcium Acetate Anhydrous (99%, Redox FCC) | 125 | 110 | — | 165 | 75 | | 80 | | |
| Acetic Acid Glacial (Redox) | 30 | 20 | 30 | 30 | 30 | 30 | 30 | 30 | 30 |
| Gum Base (7 g per 1000 mL) | 50 | 30 | 50 | 50 | 50 | 50 | | 50 | 50 |
| Calcuim Thiosulfate (50%, Bisley) | — | | 496 | | 248 | | | | — |
| Magnesium Acetate Tetrahydrate (99%, ACS) | — | | | | | 165 | | | — |
| Potassium Tripolyphosphate (98% Prayon) | — | | | | | | | 550 | — |

TABLE-continued

|  | Example: | | | | | | | | |
|---|---|---|---|---|---|---|---|---|---|
|  | 1 | 2 | 3 | 4 | 5 | 6 | 7 | 8 | 9 |
| Supa Zinc EDTA (Agrichem) | — | 89 | | | | | | | — |
| Manganese sulphate mono (31% Mn min, Redox) | — | | | | | | | 100 | — |
| Calcium Nitrate Tetrahydrate (98% Redox) | — | | | | | | | | 185 |
| PROPERTIES | | | | | | | | | |
| Specific Gravity @ 25 C. | 1.45 | 1.43 | 1.46 | 1.31 | 1.48 | 1.44 | na | 1.37 | 1.48 |
| Ph @ 25 C. | 8.8 | 9.0 | 8.4 | 9.5 | 8.7 | 8.9 | 9.00 | 8.7 | 8.6 |
| Dispersion 5% in distilled water | Colloidal | Colloidal | Colloidal | Coarse | Colloidal | Coarse | na | Coarse | Colloidal |
| Viscosity, Spindle 3, Brookfield RVT | | | | | | | | | |
| 20 rpm, cps | 2700 | 1950 | 5000 | 3400 | 2000 | <100 | >5000 | <100 | 5000 |
| 50 rpm, cps | 1360 | 980 | 2000 | 1540 | 1000 | <100 | >2000 | <100 | 2000 |
| Particle Size Malvern Mastersizer 2000 | | | | | | | | | |
| D(50) um | 0.2 | 0.3 | 0.2 | 16.0 | 0.4 | 3.7 | na | 10.6 | 1.0 |
| D(90) um | 0.9 | 1.1 | 0.8 | 50.0 | 2.1 | 5.1 | na | 53.2 | 3.3 |
| Total Elemental Content | | | | | | | | | |
| Potassium K2O, % w/w | 21.4 | 19.5 | 20.7 | 14.5 | 21.0 | 21.6 | 19.8 | 16.8 | 20.8 |
| Phosphorus P2O5, % w/w | 16.1 | 14.3 | 15.6 | 10.9 | 15.80 | 15.7 | 17.9 | 12.6 | 15.6 |
| Calcium Ca, % w/w | 2.1 | 1.9 | 2.0 | 2.7 | 2.1 | | 1.4 | | 2.1 |
| Other Elements (xx), % w/w | — | 0.3 (Zn) | 5.0 (S) | | 1.7 (S) | 1.3 (Mg) | | 2.3 (Mn) | 1.5 (N) |
| Insoluble Solids Content % w/w | 15.8 | 14.3 | 15.0 | 10.6 | 15.0 | | 100 | | 15.6 |

This example shows at least some of the benefits of the present invention in that the dispersion has, among other beneficial properties, an advantageous viscosity and particle size.

Example 2

A dispersion was prepared by using the same general procedure set forth in Example 1 except that the amount of the reagents were reduced (by 10%), and optional agrochemicals were included. In this case, 89 grams of Supa Zinc (Agrichem LTD) was added. Supa Zinc contains 5.9% w/w of zinc present as dipotassium salt of zinc EDTA. The ingredients employed in this Example are summarized in the Table. Physical and chemical testing was likewise conducted and the results are set forth in the Table.

This example illustrates that other fertilizer ingredients may be readily incorporated in the composition. Also, the composition was modified by reducing the amount of potassium calcium pyrophosphate to allow incorporation of 0.3% w/w zinc. This example also illustrates that advantageous dispersions can be achieved with changes to the quantity of the base ingredients while maintaining appropriate molar ratios.

Example 3

A dispersion was prepared by using the same general procedure set forth in Example 1 except calcium thiosulfate was used instead of calcium acetate. The ingredients employed in this example are summarized in the Table. Physical and chemical testing was likewise conducted and the results are set forth in the Table.

This example demonstrates that other water-soluble calcium salts may be substituted for calcium acetate to get a similar outcome.

Example 4

A dispersion was prepared by using the same general procedure set forth in Example 1 except that ratio of calcium to phosphorus was reduced from 1:4.2 to 1:2.2. The ingredients employed in this Example are summarized in the Table. Physical and chemical testing was likewise conducted and the results are set forth in the Table.

This example demonstrates the ability to alter particle size based upon the ratio of phosphorus to calcium. Namely, an increase in the amount of calcium relative to phosphorus will result in increased particle size.

Example 5

A dispersion was prepared by using the same general procedure set forth in Example 1 except that both calcium acetate and calcium thiosulphate were used as the soluble calcium salt. The ingredients employed in this Example are summarized in the Table. Physical and chemical testing was likewise conducted and the results are set forth in the Table.

This example demonstrates the ability to employ a mix of different water-soluble calcium salts, which advantageously allows for optimizing the nutrient mix in the formulation and/or the final cost of the formulation.

Example 6

A dispersion was prepared by using the same general procedure set forth in Example 1 except that the calcium acetate was replaced with a molar equivalent quantity of magnesium acetate tetrahydrate. The ingredients employed in this Example are summarized in the Table. Physical and chemical testing was likewise conducted and the results are set forth in the Table.

The use of a water-soluble magnesium salt in the place of a water-soluble calcium salt gave very lower viscosity and a much coarser dispersion. These characteristics suggest that this composition would not be useful for the intended purpose because the composition would have unacceptable shelf life. Accordingly, this example demonstrates the advantages of employing calcium as the cation, especially as it relates to generating a self-stabilizing viscosity for the final mix and for producing advantageous particle sizes.

Example 7

A dispersion was prepared by using the same general procedure set forth in Example 1 except that the tetrapotassium pyrophosphate was replaced with potassium tripolyphosphate while still maintaining the ratio of phosphorus to calcium ratio identical to Example 1. The ingredients employed in this Example are summarized in the Table. Physical and chemical testing was likewise conducted and the results are set forth in the Table.

Although the molar ratio of calcium to phosphorus was maintained similar to Example 1, the use of a tripolyphosphate rather than a pyrophosphate resulted in exceedingly high viscosity. The resulting mix was a not a flowable liquid but rather a semi-solid paste. These characteristics suggest that this composition would not be useful for the intended purpose. Accordingly, this example demonstrates the advantages of using the pyrophosphate for generating fine-sized particles within a flowable aqueous dispersion of potassium calcium polyphosphate.

Example 8

A dispersion was prepared by using the same general procedure set forth in Example 1 except that the calcium acetate was replaced with a molar equivalent quantity of manganese sulfate monohydrate. The ingredients employed in this Example are summarized in the Table. Physical and chemical testing was likewise conducted and the results are set forth in the Table.

Although the molar ratio of metal cation to phosphorus was maintained similar to Example 1, the use of a water-soluble manganese salt in the place of a calcium salt gave very low viscosity and an unacceptable particle size. The neat mixture rapidly segregated into a clear liquid layer disposed on a wet cake or solids layer. These characteristics suggest that this composition would not be useful for the intended purpose because the composition would have an unacceptable shelf life. Accordingly, this example demonstrates the advantages of employing calcium as the cation, especially as it relates to generating a self-stabilizing viscosity for the final mix and for producing advantageous particle sizes.

Example 9

A dispersion was prepared by using the same general procedure set forth in Example 1 except that the calcium acetate was replaced with a molar equivalence of calcium nitrate tetrahydrate. The ingredients employed in this Example are summarized in the Table. Physical and chemical testing was likewise conducted and the results are set forth in the Table.

As with Example 3 above, this example demonstrates that other water-soluble calcium salts may be substituted for calcium acetate. Some distinctions, however, were observed that could impact the ultimate use of the product for the intended use. For example, while the viscosity that developed was adequate to self stabilize the formulation, the particle size remained slightly coarser than achieved using calcium acetate. Furthermore, the dispersion was not fully cold stable in that crystals of potassium nitrate formed at temperatures below 10° C. This suggests that for calcium nitrate to be used, a more diluted version would be required than is required for calcium acetate (Example 1) and calcium thiosulfate (Example 3).

Various modifications and alterations that do not depart from the scope and spirit of this invention will become apparent to those skilled in the art. This invention is not to be duly limited to the illustrative embodiments set forth herein.

What is claimed is:

1. An aqueous dispersion comprising:
   i. water; and
   ii. potassium calcium polyphosphate dispersed within the water, where said dispersion is characterized by a particle size distribution wherein at least 90% of the particles within the dispersion have a particle size of less than 1 micron, and where said aqueous dispersion includes from 15% to 25% w/w suspended particles having a particle size of less than 1 micron.

2. The composition of claim 1, where the potassium calcium polyphosphate is dipotassium calcium pyrophosphate.

3. The composition of claim 1, further comprising a plant nutrition compound, a plant growth regulator, or a plant beneficial microbe.

4. The composition of claim 1, where said dispersion is characterized by a pH of from about 8.0 to about 9.5.

5. The composition of claim 1, where said dispersion is characterized by a total solids content of from about 40% to about 60% and suspended solids content of from 18% to 22%.

6. The composition of claim 1, where said dispersion is characterized by a shelf life, as determined by CIPAC method: MT 46 Accelerated Storage Tests by Heating of at least 12 months.

7. The composition of claim 2, where said dipotassium calcium pyrophosphate is appreciably insoluble within the water.

8. The composition of claim 1, where said dispersion is characterized by a particle size distribution wherein at least 90% of the particles within the dispersion have a mean particle size of about 0.2 to 0.4 microns.

9. The composition of claim 1, where said dispersion is characterized by a pH of at least 6.0.

10. A method of applying dipotassium calcium pyrophosphate as a fertilizer to plant, the method comprising:
    i. providing an aqueous dispersion of potassium calcium polyphosphate; and
    ii. applying the aqueous dispersion of potassium calcium polyphosphate to the plant where said dispersion is characterized by a particle size distribution wherein at least 90% of the particles within the dispersion have a particle size of less than 1 micron, and where said aqueous dispersion includes from 15% to 25% w/w suspended particles having a particle size of less than 1 micron.

11. The method of claim 10, where the potassium calcium polyphosphate is dipotassium calcium pyrophosphate.

12. The method of claim 10, where said step of applying includes spraying, or drenching the surrounding soil, or foliar application.

13. The composition of claim 1, where said dispersion is characterized by a Brookfield viscosity (Brookfield RVT, spindle #3, 25° C., 20 rpm) of from about 1500 to about 3000 cps.

14. The method of claim 10, where said dispersion is characterized by a Brookfield viscosity (Brookfield RVT, spindle #3, 25° C., 20 rpm) of from about 1500 to about 3000 cps.

* * * * *